(12) United States Patent
Striem-Amit

(10) Patent No.: US 10,503,897 B1
(45) Date of Patent: Dec. 10, 2019

(54) DETECTING AND STOPPING RANSOMWARE

(71) Applicant: CYBEREASON, Boston, MA (US)

(72) Inventor: Yonatan Striem-Amit, Somerville, MA (US)

(73) Assignee: CYBEREASON, Boston, MA (US)

( * ) Notice: Subject to any disclaimer, the term of this patent is extended or adjusted under 35 U.S.C. 154(b) by 192 days.

(21) Appl. No.: 15/649,255

(22) Filed: Jul. 13, 2017

Related U.S. Application Data

(60) Provisional application No. 62/361,792, filed on Jul. 13, 2016.

(51) Int. Cl.
| | | |
|---|---|---|
| G06F 21/00 | (2013.01) | |
| G06F 21/55 | (2013.01) | |
| G06F 11/14 | (2006.01) | |

(52) U.S. Cl.
CPC ........ G06F 21/554 (2013.01); G06F 11/1451 (2013.01); G06F 11/1464 (2013.01); G06F 21/552 (2013.01)

(58) Field of Classification Search
CPC .. G06F 21/554; G06F 11/1464; G06F 21/552; G06F 11/1451
See application file for complete search history.

(56) References Cited

U.S. PATENT DOCUMENTS

| | | | | |
|---|---|---|---|---|
| 2015/0235025 | A1* | 8/2015 | Mundy | G06F 21/565 726/23 |
| 2016/0180087 | A1* | 6/2016 | Edwards | G06F 21/566 726/24 |
| 2016/0378988 | A1* | 12/2016 | Bhashkar | G06F 21/566 726/24 |
| 2017/0006049 | A1* | 1/2017 | Muttik | H04L 63/1416 |
| 2017/0091453 | A1* | 3/2017 | Cochin | G06F 21/565 |
| 2017/0180394 | A1* | 6/2017 | Crofton | H04L 63/145 |
| 2017/0206353 | A1* | 7/2017 | Jai | G06F 21/565 |
| 2017/0364681 | A1* | 12/2017 | Roguine | G06F 21/554 |
| 2018/0211038 | A1* | 7/2018 | Breiman | G06F 11/14 |

\* cited by examiner

*Primary Examiner* — Jeffrey C Pwu
*Assistant Examiner* — William A Corum, Jr.
(74) *Attorney, Agent, or Firm* — Brake Hughes Bellermann LLP

(57) ABSTRACT

Techniques of operating a computer involve providing controls to an OS that monitor a rate at which commands in an operating system are performed. Along these lines, ransomware performs the OS commands it needs to control access to data files on a computer by performing those commands rapidly. In many cases, such rapid sequences of commands, e.g., read-copy-encrypt-delete, are performed much more rapidly than would be done by a typical user. Accordingly, the OS is then provided the capacity to monitor, e.g., a number of specified command sequences (e.g., read-copy-encrypt-delete) within some specified period of time (e.g., a minute, 5 minutes, an hour, or greater or less). If the number is greater than some threshold number, then the computer may take a remedial action such as issuing an alert to the user and/or limiting the rate at which the commands may be performed.

18 Claims, 3 Drawing Sheets

| Command Sequence | Count per 5 minutes |
|---|---|
| READ | 135 |
| WRITE | 90 |
| COPY | 100 |
| DELETE | 20 |
| READ-COPY | 60 |
| READ-COPY-DELETE | 15 |

DETECTING AND STOPPING RANSOMWARE

CROSS REFERENCE TO RELATED APPLICATION

This application claims priority to U.S. Provisional Application No. 62/361,792, filed on Jul. 13, 2016, the disclosure of which is incorporated herein by reference in its entirety.

TECHNICAL FIELD

This description relates to preventing malware, especially ransomware, from running on computers.

BACKGROUND

A computer stores information using files. Files are generally pointers to locations in non-volatile memory where the information is stored. Users may manipulate files via commands in a conventional operating system. Such commands include the following: reading (information loaded from the non-volatile memory), writing (information loaded into the non-volatile memory), deleting (pointers to information erased and/or information removed from the locations in the non-volatile memory), copying (storing the information in another memory location and providing a new pointer to that other location), overwriting (information replaced in the non-volatile memory), and encrypting (performing a mathematical function on the information to make the information inaccessible without a decryption key). A user may initiate these commands which may be performed locally or remotely over a network.

SUMMARY

In one general aspect, a method of protecting computers from malicious applications includes receiving, by controlling circuitry of a computer having a non-volatile memory and being connected to a network, data over the network, the data including a set of instructions configured to cause the controlling circuitry to perform sequence of operating system commands on a set of files stored in the non-volatile memory. The method also includes performing, by the controlling circuitry, a monitoring operation on the data to produce a measurement of a rate of performance of the sequence of operating system commands on a subset of the set of files. The method further includes, in response to the measurement of the rate of performance of the operating system commands on the subset of the set of files being greater than a specified threshold, generating, by the controlling circuitry, an alert indicating that the sequence of operating system commands were issued by a malicious actor. The method further includes, in response to the measurement of the rate of performance of the sequence of operating system commands on the subset of the set of files being less than the specified threshold, not generating, by the controlling circuitry, the alert.

The details of one or more implementations are set forth in the accompanying drawings and the description below. Other features will be apparent from the description and drawings, and from the claims.

DETAILED DESCRIPTION

Figure 1:
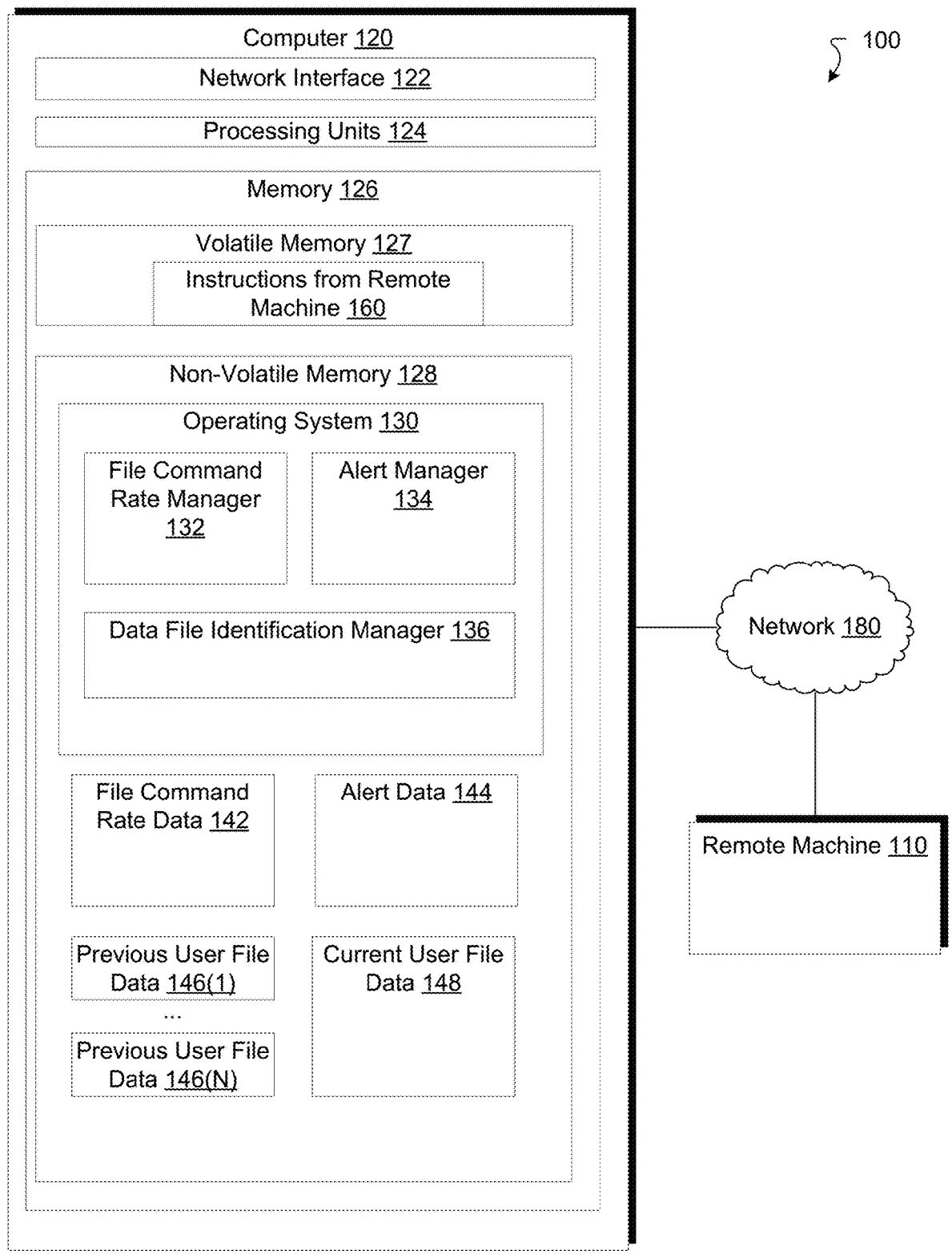
FIG. 1 is a diagram that illustrates an example electronic environment according to an implementation of improved techniques described herein.

The above-described conventional operating system is vulnerable to ransomware, a type of malware that restricts access to an infected computer system in some way, and that may demand that a user pay malicious actors a ransom to remove the restriction. Many types of ransomware may restrict such an infected system. For example, some ransomware may encrypt the boot record which can be circumvented, e.g., by keeping non-malleable backups while other ransomware may encrypt various other files.

In many cases, targets of ransomware are high value files. Such files include office documents, text documents, pictures such as jpg files, video, other user generated files and the like. Because these files will often be unique to a user, they can be hard to replace and pose an attractive target for a malicious actor. The ransomware may work by searching for data files in a non-volatile memory, copying the data files, encrypting the copies, and deleting the original files.

In contrast to the above-described conventional operating system (OS) which is vulnerable to ransomware, improved techniques of operating a computer involve providing controls to an OS that monitor a rate at which commands in an operating system are performed. Along these lines, ransomware performs the OS commands it needs to control access to data files on a computer by performing those commands rapidly. In many cases, such rapid sequences of commands, e.g., read-copy-encrypt-delete, are performed much more rapidly than would be done by a typical user. Accordingly, the OS is then provided the capacity to monitor, e.g., a number of specified command sequences (e.g., read-copy-encrypt-delete) within some specified period of time (e.g., a minute, 5 minutes, an hour, or greater or less). If the number is greater than some threshold number, then the computer may take a remedial action such as issuing an alert to the user and/or limiting the rate at which the commands may be performed. Advantageously, by alerting the user and limiting the rate of command performance, the computer is able to limit or stop a ransomware attack.

Alternatively, the computer may take other actions such as keeping additional copies of the files in a state that it can access at need.

Broadly speaking, ransomware first finds files to encrypt, read the files, encrypt the files and overwrite the previous versions of the files. Some of these steps may be taken together. For example, encrypting files and overwriting the files can be combined by encrypting in place. These combinations, while not unique to ransomware, are highly specific. In particular, overwriting a file with random data (or data with high entropy) is highly unusual.

Ideally, a first line of defense against ransomware may be an OS. For example, most disks in modern systems are not filled to capacity. If previous versions of files are kept in the regions of a disk that is not utilized, a large amount of copies may be stored on the disk at very low cost. For example, suppose we have a 1 TB disk. The vast majority of the space on the disk will be utilized by software or the OS itself. User-created files occupy a small fraction of the disk space. By keeping past version of the files in the regions of the disk that is not utilized, a huge amount of redundancy may be made available. This would make it more likely that the malicious actor overwrites storage space in the regions of the disk that is not utilized to make sure the old versions are overwritten. Of course, that storage space can be formally allocated such that user-created files are allocated extra backups. The amount of storage space allocated will determine the resilience of the system.

User-created files can be defined in many ways. For example, time spent before first write to disk (copied files are written much faster than created ones), program which wrote to disk (e.g., files created by a word processor are typically user created), speed in which the file was initially written to disk, access times, copied times, directories (e.g., files stored on servers in the cloud), etc. Indicators that indicate combinations of these user-created files or additional indicators may also be used to detect ransomware.

Another technique involves looking for files which are typically not modified. Such files include the vast majority of user-created files. Examples of such files include picture and video files, which are typically read-only. Attempts to modify such files are suspicious and can raise an alert. Such alerts may request user intervention or change the OS to keep old versions of files in a temporary directory for a time period.

More broadly, even files which may be changed are not changed that often. For example, while document files may be changed, a majority of such files are not changed in a short time period. Thus, rate-limiting the speed of file change can prevent the vast majority of damage. Once again, the effect of rate-limiting can be either explicit (e.g., not allowing files to be modified) or implicit (e.g., keep additional backup copies). Rate-limiting can be either across all files or across the destruction of existing data. Furthermore, it may be optionally decided to not limit files which may be erased but only files which may be read and then erased. Of course, such rate limits can be fixed or can depend on user behavior or system-wide likelihood of rates.

While files that are changed are suspicious, file creation may also be suspicious. A malicious actor who attempts to encrypt many types of files such as word processing documents or JPEG files will actually create (at least slightly) larger files due to the fact that these file formats are already compressed. Thus, looking for file size increases can in some cases be useful.

In general, information in files can be used not merely in terms of compression size but also in other ways. For example, an amount of information (information is using in the technical sense from information theory) that has changed in a program may be examined. Typically, the amount of data in a file even when the file is edited does not change much. Thus, metrics of how much the file has changed such as mutual information may be measured. Files that are changed by a large amount according to such metrics may trigger an alert.

Another indicator involves files that are typically not overwritten. For example, office files are not typically overwritten. Instead each incremental change of the file results in a new file at the OS level which is then renamed with the same name as the old file. Given that the OS typically does not write that often the old file is likely to remain for a relatively long period and to be recoverable on the disk. However, the ransomware typically overwrites the old file in order to prevent recovery. Thus, looking for programs in which the files are overwritten, especially when this is not typical for these type of files (e.g. word processing documents) is highly suspicious and can result in an alert.

More generally, the behavior of reading a file and then overwriting it is, for most types of files, suspicious. This is a typical for ransomware since the ransomware typically conserves the data but make it hard to read. However, the behavior is not a general phenomenon. Even in cases such as databases, the read and then overwrite operations are limited to a small fraction of files or data in a given file. Reading entire files and then deleting them is highly irregular and may result in an alert or action.

Of course, these various indicators can interact and complement each other. A program which has several indicators will be more suspicious than a program which exhibits only one of these indicators. Some indicators will be more informative than others and some interactions will be more suspicious.

FIG. 1 is a diagram that illustrates an example electronic environment 100 in which the above-described improved techniques may be implemented. As shown, in FIG. 1, the example electronic environment 100 includes a remote machine 110, a computer 120, and a network 180.

The remote machine 110 is a computing device, e.g., a personal computer, a server computer, a smartphone, etc, from which data including instructions 160 is sent over the network 180 to the computer 120 and read into volatile memory 127 (e.g., RAM). The nature of the instructions and the actor who sent them to the computer are unknown. If the actor is malicious, then the instructions sent may contain operating system commands that, when executed, will transfer access of user file data 148 to the malicious actor.

The computer 120 takes the form of a desktop computer or laptop computer, although in some implementations the computer 120 may take the form of a smartphone or tablet computer. As shown in FIG. 1, the computer 120 is configured to detect ransomware and provide opportunities for the user and the computer 120 to minimize or eliminate its impact. The computer 120 includes a network interface 122, one or more processing units 124, and memory 126. The network interface 122 includes, for example, Ethernet adaptors, Token Ring adaptors, and the like, for converting electronic and/or optical signals received from the network 180 to electronic form for use by the computer 120. The set of processing units 124 include one or more processing chips and/or assemblies. The memory 126 includes both volatile memory 127 (e.g., RAM) and non-volatile memory 128, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include an operating system 130, file command rate manager 132, an alert manager 134, and a data file identification manager 136. Further, as illustrated in FIG. 1, the memory 126 is configured to store various data, which is described with respect to the respective managers that use such data.

The OS 130 is configured to manage the files stored in the non-volatile memory 128 via a file manager application. Examples of operating systems on personal computers such as the computer 120 include Windows® by Microsoft Corp., Linux by Red Hat, Inc., and OS X by Apple, Inc, with each OS example including its own file management application. Each such file management application offers the user to issue OS commands that manipulate files.

Each file managed by the OS 130 is a pointer to information stored in the non-volatile disk 128 as well as other identifying information known as a metafile. The pointer identifies addresses of blocks of storage in the non-volatile disk 128 at which the file information is stored. The information in the metafile includes information about file size, version number, and permission states (e.g., permission for a user to read and modify a file).

The OS commands issued by a user via the file manager include opening a file, reading the file (i.e., loading the information into volatile memory 127), writing to the file (storing information in the non-volatile memory 128 in the locations pointed to by the file), copying the file (i.e., reading the information and writing the information in a new file), and deleting a file (removing the information from the non-volatile storage and/or removing the pointers to the locations in the non-volatile memory 128). In some arrangements, the OS commands include encrypting the information of a file and decrypting encrypted information.

In addition to the usual OS commands and functionality, the OS 130 also offers additional functions configured to limit or eliminate the impact of ransomware on the files stored in the memory 126. The additional functions include the file command rate manager 132, the alert manager 134, and the data file identification manager 136.

The file command rate manager 132 is configured to measure a rate at which certain OS commands are being issued and/or performed on file data 148 stored in non-volatile memory 128 to produce file command rate data 142. In some arrangements, the file command rate manager 132 is configured to count a number of specified operations or sequences of operations within a specified period of time.

The file command rate data 142 includes data indicating how much particular OS commands or command sequences have been issued or executed in a specified period of time. In some implementations, the file command rate data 142 includes a table 200 enumerating possible command sequences and the corresponding rates at which the OS commands and command sequences have been issued. An example of such a table is shown in FIG. 2.

Figure 2:
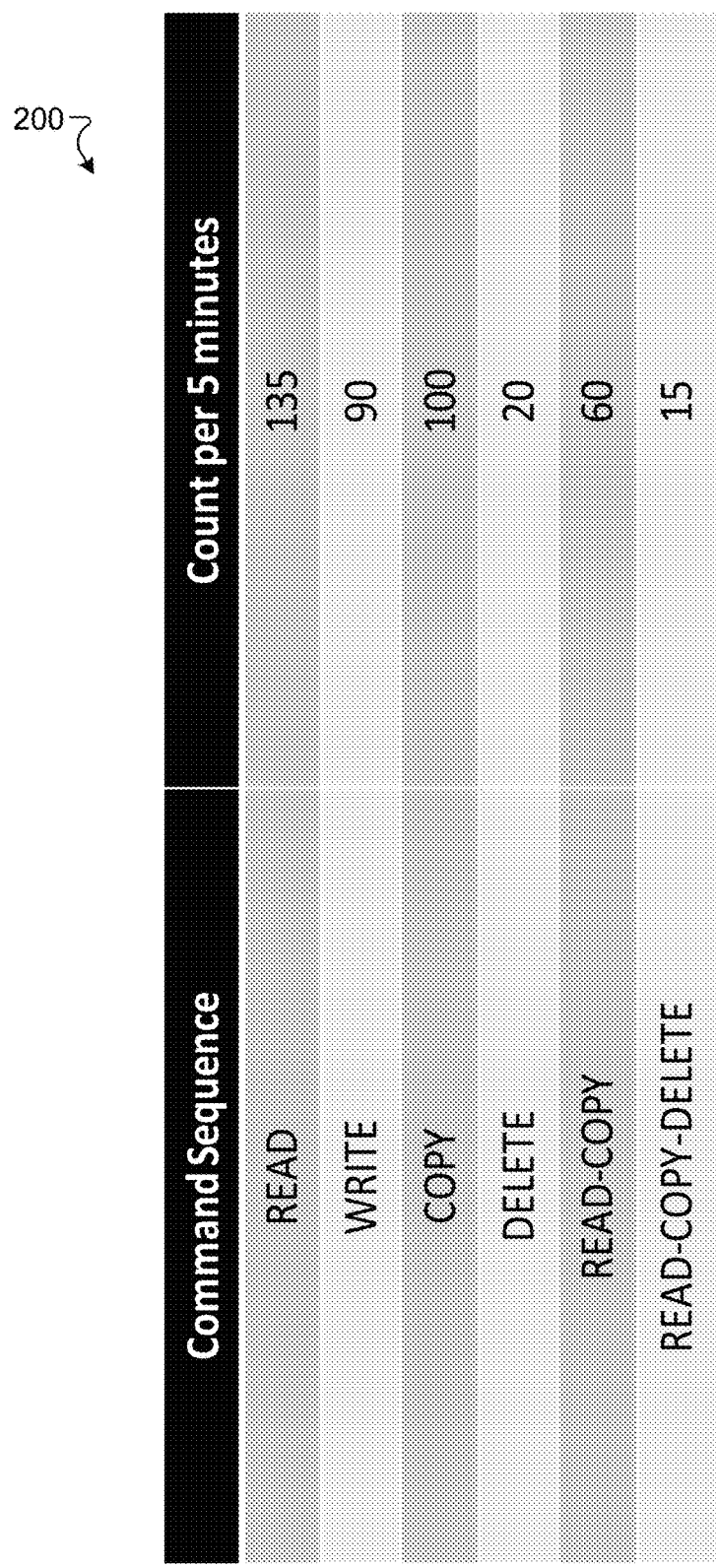
FIG. 2 is a table that illustrates an example monitoring of operating system commands within the electronic environment illustrated in FIG. 1.

FIG. 2 illustrates an example enumeration table 200. The command sequences enumerated are not exhaustive and meant for illustration. The left column lists the command sequences and the right column lists a count of command sequence operations executed in the past 5 minutes. In some implementations, the counts reflect a moving window of time. In some implementations, the counts reflect a current, fixed period of time.

In some implementations, the file command rate manager 132 performs the counting of the command sequences enumerated in the table 200 by monitoring the metadata of the current user file data 148. In one example, a change in the version number of a file means that a write command was performed on that file. In another example, a change in the size of a file may also mean that a write command was performed on that file. The loading of a file's contents into the volatile memory 127 means that a read command was performed on that file. The appearance of a new file having the same size as another file may imply that a copy command was performed on the other file.

Along these lines, based on the results in the table 200, there are 15 read-copy-delete sequences performed in a 5-minute period of time. Whether that number of command sequences may trigger remedial action from the computer 120 depends on a threshold number set by a user or automatically based on machine learning. Additional factors that may trigger remedial action include changes in file size between copy and original file, file type being copied and/or rewritten, whether entire contents of files are read into the volatile memory 127. For example, it is uncommon for users to copy large video or image files in the disk; accordingly, the copying of such files in and of themselves may trigger remedial action. Also, it is uncommon for file sizes to change significantly as a result of a single write command; accordingly, a size change threshold for writing may be defined as well.

Returning to FIG. 1, the remedial actions that the computer 120 may take in response to a triggering condition as described above may be performed by either the alert manager 134 or the data file identification manager 136.

The alert manager 134 is configured to generate an alert according to the alert data 144 in response to a triggering condition as described above. In some implementations, the alert data 144 includes an alert type, e.g., email, SMS message, dialog box, and the like. In some implementations, the alert data 144 includes a message based on the triggering condition triggering the alert. One example message may indicate that too many files are being copied and erased. Another example message may indicate that word processing files are being replaced with much larger files.

In response to receiving an alert, a user may take a manual, remedial action (e.g., shutting down a network, backing up data files, not allowing the actions to continue etc.). In some implementations, the OS 130 may automatically take remedial action and prevent certain commands and/or command sequences from being performed according to the triggering condition triggering the alert. In some implementations, the OS 130 may limit the rate at which OS commands may be executed; in this way, a user has time to protect the user file data 148 from being made inaccessible by ransomware.

The data file identification manager 136 is configured to identify user data files stored in the non-volatile memory 128 and take steps to protect them from OS commands suspected to have originated from a malicious actor, e.g., ransomware. Along these lines, in many cases most storage space in the non-volatile memory 128 is occupied by the OS 130 and software applications. User file data such as the current user file data 148 occupies relatively little storage space. Accordingly, the data file identification manager 136 is configured to search for such user file data 148 and copy it several times to various locations throughout the non-volatile memory 128, eventually becoming previous user file data 146(1), . . . , 146(N), N being the number of locations. In some implementations, the data in the previous user file data 146(1), . . . , 146(N) is not updated but rather the version number remains the same for a specified period of time. In this way, instructions originating from ransomware may find it difficult to control access to files as a user may simply move to protect any of the previous user file data, e.g., previous user file data 146(1), in response to an alert from alert manager 134.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the computer 120 can be, or can include, processors configured to process instructions stored in a memory. For example, the process migration manager 130 (and/or a portion thereof), the application output comparison manager 140 (and/or a portion thereof), and the access control manager 170 (and/or a portion thereof) can be a combination of a processor and a memory configured to execute instructions related to a process to implement one or more functions.

Figure 3:
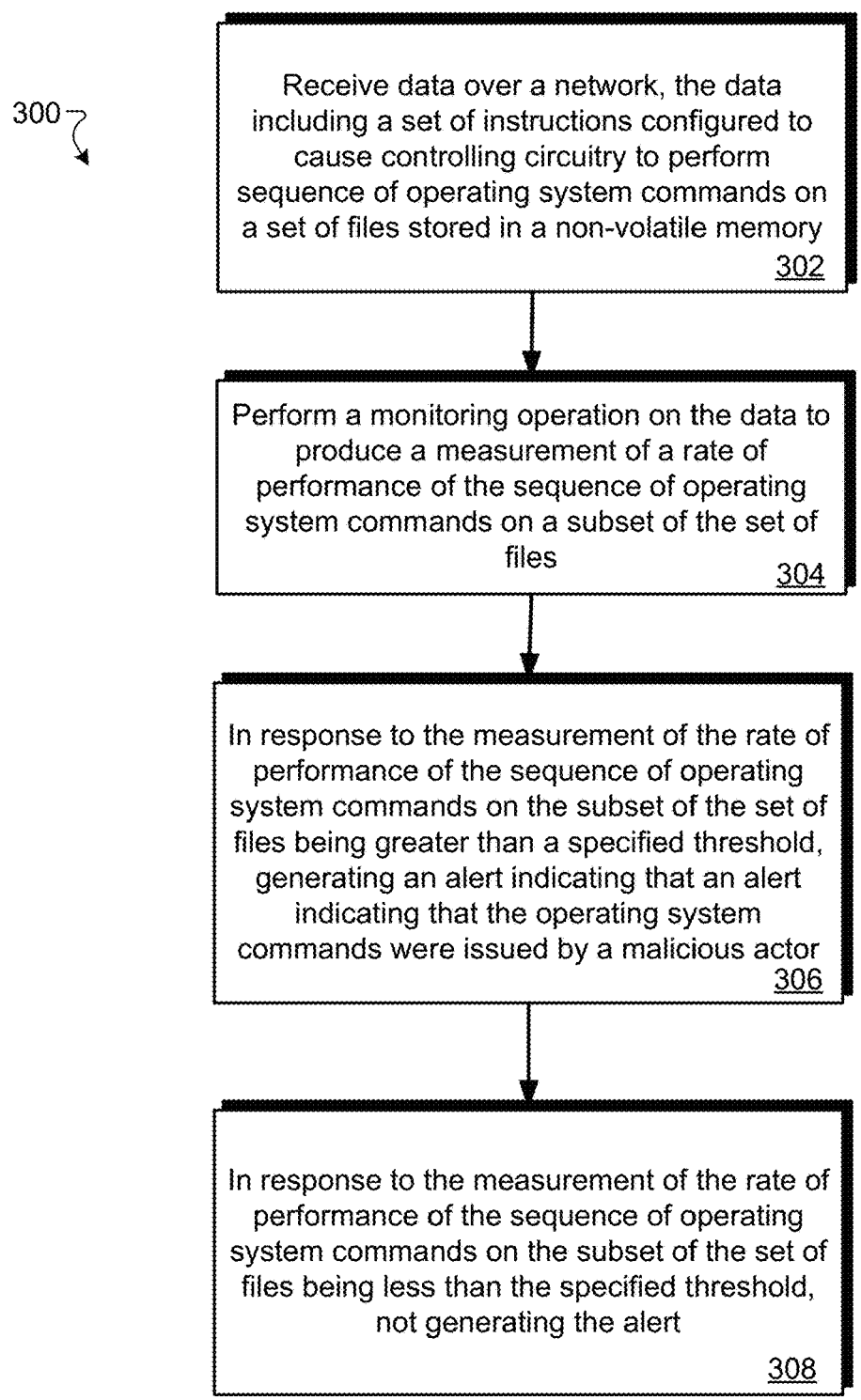
FIG. 3 is a diagram that illustrates an example method according to the improved techniques described herein.

FIG. 3 is a flow chart that illustrates an example method 300 of protecting computers from malicious applications. The method 300 may be performed by software constructs described in connection with FIG. 1, which reside in memory 126 of the computer 120 and are run by the set of processing units 124.

At 302, the computer 120 receives data over the network 180, the data including a set of instructions 160 configured to cause controlling circuitry 124 or the computer 120 to perform operating system commands on a set of files stored in non-volatile memory 128.

At 304, the computer 120 performs a monitoring operation on the data 148 to produce a measurement, e.g., rate data 142, of a rate of performance of the operating system commands on a subset of the set of files, e.g., user file data 148.

At 306, the computer 120, in response to the measurement of the rate of performance of the operating system commands on the subset of the set of files being greater than a specified threshold, generates an alert, e.g., based on alert data 144, indicating that the operating system commands were issued by a malicious actor. In some implementations, the computer 120 or a user may perform remedial actions in response to the alert. In some implementations, the computer 120 can limit the rate at which OS commands may be performed on the user file data 148. In some implementations, the user or the computer 120 may back up the user file data into different locations in the non-volatile memory 128.

At 308, the computer 120, in response to the measurement of the rate of performance of the operating system commands on the subset of the set of files being less than the specified threshold, not generating the alert. Generally speaking, when there is no evidence of ransomware behavior, the computer 120 may operate as usual.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   receiving, by controlling circuitry of a computer having a non-volatile memory, data including a set of instructions configured to cause the controlling circuitry to perform a sequence of operating system commands on a set of files stored in the non-volatile memory;
   performing, by the controlling circuitry, a monitoring operation on the data, including counting a number of files of a specified file type being copied within a specified period of time, to produce a measurement of a rate of performance of the sequence of operating system commands on a subset of the set of files, the copying of a file from the number of files including an opening of the file and a reading of the contents of the file into a volatile memory, and further including (i) counting a number of files for which the sequence of commands read-encrypt-write-delete is performed within a specified time period, a file from the number of files having been read subsequently having been deleted and (ii) counting a number of files having a read-only permission state that have been copied into new files not having the read-only permission state within a specified period of time;
   in response to the measurement of the rate of performance of the operating system commands on the subset of the set of files being greater than a specified threshold, generating, by the controlling circuitry, an alert indicating that the sequence of operating system commands were issued by a malicious actor; and
   in response to the measurement of the rate of performance of the sequence of operating system commands on the subset of the set of files being less than the specified threshold, not generating, by the controlling circuitry, the alert.

2. The method as in claim 1, wherein the performing the monitoring operation includes:
   counting a number of files copied and then the files of the number of files, from which copies were produced, being erased within a specified time period.

3. The method as in claim 1, wherein performing the monitoring operation includes:
   counting a number of files being created within a specified time period.

4. The method as in claim 1, wherein performing the monitoring operation includes:
   counting a number of files being encrypted within a specified time period.

5. The method as in claim 1, wherein performing the monitoring operation includes:
   counting a number of files whose contents are read in their entirety into volatile memory within a specified time period.

6. The method as in claim 5, where performing the monitoring operation further includes:
   counting a number of files whose contents are subsequently erased after being read in their entirety into volatile memory within the specified time period.

7. The method as in claim 1, further comprising:
   in response to the number of files of the specified file type being copied within the specified period of time being greater than the threshold, performing an erase disable operation on files of the specified type stored in the non-volatile medium, the erase disable operation disabling copy commands from being performed on the files of the specified type stored in the non-volatile medium.

8. The method as in claim 1, wherein the specified file type is a file type associated with user generated data including one of a group of file types including a text file, a video file, and an image file.

9. The method as in claim 1, wherein performing the monitoring operation includes:
   counting a number of files having a file size greater than a size threshold being copied within a specified period of time.

10. The method as in claim 1, wherein performing the monitoring operation includes:
    counting a number of files which, upon execution of a write command, has a current version whose file size has changed from that of a previous version by more than a file change threshold within a specified period of time.

11. The method as in claim 1, wherein performing the monitoring operation includes:

counting a number of files created by a user as a data file from a specified software package accessed by the user accessed within a specified period of time.

12. The method as in claim 11, wherein the software package accessed by the user is one of a word processing software package, a document processing software package, a presentation software package, a spreadsheet software package, an image editing software package, a video editing software package, and a drawing software package.

13. The method as in claim 1, wherein performing the monitoring operation includes:
counting a number of files for which a time spent before a first write to disk is less than a write-to-disk threshold within a specified period of time, the time spent indicating whether the files from the number of files were copied to a location in a non-volatile memory or created in the location in the non-volatile memory.

14. The method as in claim 1, further comprising:
in response to receiving a copy command on a file of the subset of the set of files to produce a current version of the file, storing a previous version of the file in unutilized portion of the non-volatile memory.

15. The method as in claim 14, further comprising:
in response to the measurement of the rate of performance of the operating system commands on the subset of the set of files being greater than a specified threshold, loading the previous version of the file in a volatile memory.

16. A computer program product comprising a nontransitive storage medium, the computer program product including code that, when executed by processing circuitry of a computer having a non-volatile memory, causes the processing circuitry to perform a method, the method comprising:
receiving data including a set of instructions configured to cause the controlling circuitry to perform operating system commands on a set of files stored in the non-volatile memory;
performing a monitoring operation on the data, including counting a number of files of a specified file type being copied within a specified period of time, to produce a measurement of a rate of performance of the sequence of operating system commands on a subset of the set of files, the copying of a file from the number of files including an opening of the file and a reading of the contents of the file into a volatile memory, and further including (i) counting a number of files for which the sequence of commands read-encrypt-write-delete is performed within a specified time period, a file from the number of files having been read subsequently having been deleted and (ii) counting a number of files having a read-only permission state that have been copied into new files not having the read-only permission state within a specified period of time;
in response to the measurement of the rate of performance of the operating system commands on the subset of the set of files being greater than a specified threshold, generating an alert indicating that an alert indicating that the operating system commands were issued by a malicious actor; and
in response to the measurement of the rate of performance of the operating system commands on the subset of the set of files being less than the specified threshold, not generating the alert.

17. An electronic apparatus having a non-volatile memory, the electronic apparatus comprising:
memory; and
controlling circuitry coupled to the memory, the controlling circuitry being configured to:
receive data including a set of instructions configured to cause the controlling circuitry to perform operating system commands on a set of files stored in the non-volatile memory;
perform a monitoring operation on the data, including counting a number of files of a specified file type being copied within a specified period of time, to produce a measurement of a rate of performance of the sequence of operating system commands on a subset of the set of files, the copying of a file from the number of files including an opening of the file and a reading of the contents of the file into a volatile memory, and further including (i) counting a number of files for which the sequence of commands read-encrypt-write-delete is performed within a specified time period, a file from the number of files having been read subsequently having been deleted and (ii) counting a number of files having a read-only permission state that have been copied into new files not having the read-only permission state within a specified period of time;
in response to the measurement of the rate of performance of the operating system commands on the subset of the set of files being greater than a specified threshold, generate an alert indicating that an alert indicating that the operating system commands were issued by a malicious actor; and
in response to the measurement of the rate of performance of the operating system commands on the subset of the set of files being less than the specified threshold, not generate the alert.

18. The method as in claim 14, wherein a version number of the current version of the file remains unchanged from a version number of the previous version of the file.

* * * * *